(12) United States Patent
Ingerman et al.

(10) Patent No.: US 11,997,096 B2
(45) Date of Patent: May 28, 2024

(54) FAST, SECURE, AND SCALABLE DATA STORE AT THE EDGE FOR CONNECTING NETWORK ENABLED DEVICES

(71) Applicant: Akamai Technologies, Inc., Cambridge, MA (US)

(72) Inventors: Mark M. Ingerman, Newton, MA (US); Robert B. Bird, Orlando, FL (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/323,141

(22) Filed: May 18, 2021

(65) Prior Publication Data

US 2022/0377079 A1  Nov. 24, 2022

(51) Int. Cl.
*H04L 9/40* (2022.01)
*H04L 67/1095* (2022.01)
*H04L 67/1097* (2022.01)

(52) U.S. Cl.
CPC ........ *H04L 63/102* (2013.01); *H04L 63/0876* (2013.01); *H04L 63/1433* (2013.01); *H04L 63/20* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| 6,108,703 | A  | 8/2000 | Leighton et al. |
|---|---|---|---|
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,240,100 | B1 | 7/2007 | Wein et al. |
| 7,251,688 | B2 | 7/2007 | Leighton et al. |

(Continued)

FOREIGN PATENT DOCUMENTS

| JP | 2009211529 A | * | 9/2009 |
|---|---|---|---|
| TW | 1709874 B | * | 11/2020 |

OTHER PUBLICATIONS

Alejandro et al., "Scaling geo-replicated databases to the MEC environment", Sep. 1, 2015, IEEE (Year: 2015).*

(Continued)

*Primary Examiner* — Lance Leonard Barry
*Assistant Examiner* — Mohammad Yousuf A. Mian (57) ABSTRACT

A distributed computing system provides a distributed data store for network enabled devices at the edge. The distributed database is partitioned such that each node in the system has its own partition and some number of followers that replicate the data in the partition. The data in the partition is typically used in providing services to network enabled devices from the edge. The set of data for a particular network enabled device is owned by the node to which the network enabled device connects. Ownership of the data (and the data itself) may move around the distributed computing system to different nodes, e.g., for load balancing, fault-resilience, and/or due to device movement. Security/health checks are enforced at the edge as part of a process of transferring data ownership, thereby providing a mechanism to mitigate compromised or malfunctioning network enabled devices.

17 Claims, 8 Drawing Sheets

(56) References Cited

U.S. PATENT DOCUMENTS

| | | | |
|---|---|---|---|
| 7,254,634 B1 | 8/2007 | Davis et al. | |
| 7,274,658 B2 | 9/2007 | Bornstein et al. | |
| 7,293,093 B2 | 11/2007 | Leighton et al. | |
| 7,340,505 B2 | 3/2008 | Lisiecki et al. | |
| 7,472,178 B2 | 12/2008 | Lisiecki et al. | |
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,603,439 B2 | 10/2009 | Dilley et al. | |
| 7,603,556 B2* | 10/2009 | Brown | H04L 9/3236 713/169 |
| 7,634,566 B2* | 12/2009 | Turner | H04L 51/42 707/999.008 |
| 7,716,367 B1 | 5/2010 | Leighton et al. | |
| 7,725,602 B2 | 5/2010 | Liu et al. | |
| 7,912,978 B2 | 3/2011 | Swildens et al. | |
| 7,925,713 B1 | 4/2011 | Day et al. | |
| 7,996,531 B2 | 8/2011 | Freedman | |
| 8,195,831 B2 | 6/2012 | Swildens et al. | |
| 8,489,670 B1 | 7/2013 | Fletcher et al. | |
| 10,503,427 B2 | 12/2019 | Botes et al. | |
| 2007/0271385 A1 | 11/2007 | Davis et al. | |
| 2009/0063487 A1* | 3/2009 | Bish | G06F 16/10 |
| 2010/0293281 A1 | 11/2010 | Tsimelzon et al. | |
| 2017/0093759 A1 | 3/2017 | Wistow | |
| 2018/0139122 A1 | 5/2018 | Bangalore Krishnamurthy | |
| 2019/0014471 A1* | 1/2019 | Saily | H04W 12/06 |
| 2019/0349733 A1 | 11/2019 | Nolan et al. | |
| 2020/0169605 A1 | 5/2020 | Higuchi et al. | |
| 2020/0175419 A1 | 6/2020 | Bird et al. | |
| 2020/0196210 A1 | 6/2020 | Kanitkar et al. | |
| 2022/0207135 A1* | 6/2022 | Jajoo | G06N 20/00 |
| 2022/0232459 A1* | 7/2022 | Lee | H04W 36/00835 |

OTHER PUBLICATIONS

International Search Report for PCT/US2022/072361, counterpart to current application, dated Aug. 26, 2022, 6 pages.

Written Opinion for PCT/US2022/072361, counterpart to current application, dated Aug. 26, 2022, 10 pages.

U.S. Appl. No. 11/964,113, Method of TCP state replication for fault tolerant TCP connections in an overlay network.

Huang, E., "Building a large-scale distributed storage system based on Raft | Cloud Native Computing Foundation Nov. 4, 2019, 16 pages.", Downloaded on Mar. 3, 2021. https://www.cncf.io/blog/2019/11/04/building-a-large-scale-distributed-storage-system-based-on-raft/.

Ongaro, D. et al., "An Introduction to Consensus with Raft, Stanford University, Apr. 2014, 20 pages.", http://raftconsensus.github.io.

Ongaro, D. et al., "In Search of an Understandable Consensus Algorithm (Extended Version)", Stanford University, published May 20, 2014, 18 pages.

Raft, , "The Raft Consensus Algorithm, 10 pages.", Downloaded on Mar. 3, 2021. Available at https://raft.github.io.

Jose, S. et al., "MIGRATE: Mobile Device Virtualisation Through State Transfer", IEEE Access, IEEE, USA, vol. 8, Jan. 31, 2020 pp. 25848- 25862, 8 pages.

* cited by examiner

FAST, SECURE, AND SCALABLE DATA STORE AT THE EDGE FOR CONNECTING NETWORK ENABLED DEVICES

BACKGROUND

Technical Field

This application generally relates to distributing computing systems, to edge computing, and to network enabled devices.

Brief Description of the Related Art

In a distributed computing system that provides services at the edge to network enabled devices, it is often necessary to maintain data that is associated with a given network enabled device across sessions—sometimes referred to as the given device's "state" data. In some cases, the network enabled device itself can store at least some state data and provide it upon request to a node in the system. Indeed, the well-known practice of web servers placing cookies on web clients basically provides this function.

Non limiting examples of state data include:
   In the context of MQTT (Message Queuing Telemetry Transport): connection history data of when, where, how long; persisted session data including subscriptions and subscription maps (what has been delivered); publishing sequence numbers.
   Chat: presence recipients, allowable message recipients, contact information.

In some cases, it is necessary to store such state data in the system. A network enabled device may not have the storage capacity or security attributes necessary for storing certain data. Or, the data may be needed and used to manage the device, but does not belong to that device (and should not be stored on that device) for security and control reasons. This is particularly true as more and more low-power devices are connected to the Internet. Furthermore, it is inefficient to store a large volume of data on a network enabled device and have to transfer it to a server node (potentially over a limited bandwidth or metered connection) on each connection.

A network enabled device might connect to different servers in the system over time. This might be due to network congestion, load balancing, or server failures, or because the device moves, and the nearest server changes. Hence, it is necessary for a reasonable number of different servers in the system, or, even all servers, to be able to access a given device's state data.

Some distributing computing systems use a dedicated storage subsystem to store state data. But that approach performs poorly, and will not scale sufficiently. A network enabled device's state data should be stored reliably and be accessible (e.g., read-write) with low-latency, or even ultra-low-latency, as that will significantly affect connection times and performance Additionally, without segmentation and locks, updates can collide and require significant time to reach consistency.

This patent document discloses systems and methods for efficient, high performance and persistent storage of state data at the edge of a distributed computing system with massive horizontal scale. This patent document also discloses ways of moving that state data around the distributed computing system as needed (e.g., because the associated network enabled device moves, or any other reasons), with high reliability and performance. Finally, this patent document discloses security and threat mitigation techniques that can be applied to harden the system against attacks and malfunctions, including an ability to identify potential security threats, such as compromised devices or user accounts, bots, device masquerading, replay attacks, and others.

The teachings hereof improve the function, performance, and security of computer systems themselves, namely distributed computing systems. Those skilled in the art will understand these and other improvements from the teachings hereof.

The teachings hereof can be implemented (but need not be) in a distributed computing system configured as a content delivery network or CDN. More information about CDN technologies, including examples of request routing mechanisms using DNS and otherwise, as well as proxy server technologies, can be found in the following documents, the teachings of which are hereby incorporated by reference in their entirety: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

BRIEF SUMMARY

This section describes some pertinent aspects of this invention. Those aspects are illustrative, not exhaustive, and they are not a definition of the invention. The claims of any issued patent define the scope of protection.

A distributed computing system provides a distributed data store for network enabled devices at the edge. The distributed database is partitioned such that each node in the system has its own partition and some number of followers that replicate the data in the partition for reliability purposes. The data in the partition is typically used in providing services to network enabled devices from the edge. The set of data for a particular network enabled device is owned by the node to which the network enabled device connects. Ownership of the data (and the data itself) may move around the distributed computing system to different nodes, e.g., for load balancing, fault-resilience, and/or due to device movement. Security and health checks are enforced at the edge as part of a process of transferring data ownership, thereby providing a mechanism to mitigate compromised or malfunctioning network enabled devices.

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (MIMS), SQL databases and queries, NoSQL databases and/or key-value approaches, is assumed.

All references to HTTP, TCP/IP, and/or MQTT should be interpreted to include an embodiment using encryption, such as when TLS secured connections are established. While context may indicate the hardware or the software exclusively, should such distinction be appropriate, the teachings hereof can be implemented in any combination of hardware and software. Hardware may be actual or virtualized.

Introduction

Figure 1:
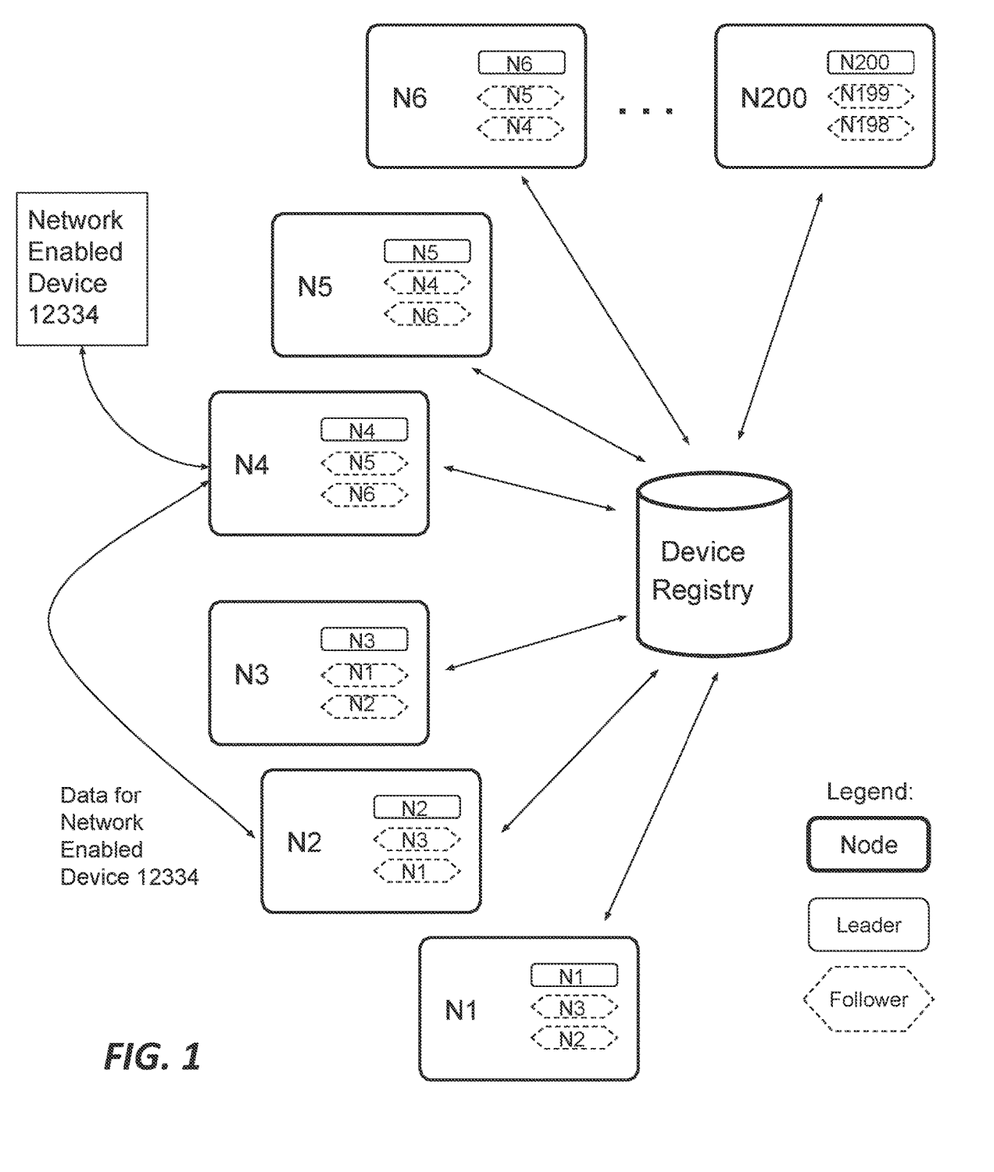
FIG. 1 is a diagram illustrating nodes in a distributed computing system providing a partitioned, replicated distributed data store in which a given node owns data associated with a given network enabled device, and such ownership can be transferred to other nodes, in accordance with one embodiment of the teachings hereof.

FIG. 1 provides a general overview of a system in accord with the invention. Nodes N1 . . . N6 are nodes in the distributed computing system. The nodes may be implemented in hardware or software. The nodes are typically (but not limited to) servers. The nodes provide one or more services to network enabled devices at the edge of a network. Exemplary services include edge computing, content delivery, messaging services, publish-subscribe services, and software/firmware delivery, among other things. The term network enabled device is used to broadly refer to all types of devices with computer networking capability, including for example a desktop or laptop, smartphones or other mobile device, vehicles, appliances, cameras, scanners, sensors, actuators, machines, point of sale terminals, and so-called 'Internet of Things' devices.

The nodes in the system provide a distributed database, with each node having its own partition. A given node acts as the leader of its own partition. There are some number of follower nodes (typically configurable), to which the contents of each partition are replicated. A given node can query a service (not shown) to determine what other nodes to use as followers (preferably nodes that are up and nearby). Thus, a given node always has its own partition stored locally and replicated closeby. Horizontal scalability is virtually unlimited. Data read/writes can be handled in any known way, e.g., requiring a quorum of nodes to respond before accepting writes, etc. If a given node fails, the replicator nodes can execute a leader election algorithm, such as Paxos or Raft, to determine who should become the leader of that failed node's partition.

When a network enabled device connects to a node, the node checks whether it "owns" the set of data associated with that network enabled device (the "state data"). If not, then it reaches out to the node that currently owns the state data and requests a transfer of ownership (and the data). The system contains a device registry, which enables any node to locate the current owner for a given network enabled device.

In the example shown in FIG. 1, each of the 200 nodes are leaders of their own partition. Each node is also a follower of two adjacent nodes. As mentioned, adding more nodes requires a given node to find follower nodes, but this can be accomplished without disrupting the existing partitions. Leader election can occur when a node comes down or back up.

Assume network enabled device 12334 connects to the system and is mapped (using known request routing techniques, such as domain name service or DNS mapping) to node N4. Node N4 can check with the device registry to see if another node owns the state for network enabled device 12334. The device registry can first check if the device 12334 has been marked as a "bad" device (e.g., compromised device or account, previously encountered malicious actor, previously encountered malfunctioning device); if so, N4 can simply drop the connection. Assuming it is not marked as a "bad" device, and if this is the first time that 12334 is connecting, then the device registry will respond that there is not yet an owner node. Hence, N4 can create the state data, store it locally, and take ownership of it. Node N4 informs the device registry that the state data for network enabled device 12334 has been generated and is owned by node N4. The state data is replicated to N5 and N6, as indicated in FIG. 1. In the course of providing service to network enabled device 12334, node N4 generates and/or receives information associated with device 12334 and stores it as part of the state data.

It should be noted that in practice, the system should implement a check to prevent race conditions, e.g., ensure that two or more nodes do not all take ownership at the same time and overwrite the relevant records at the device registry.

Ownership of data associated with a given network enabled device implies a restricted set of permissions giving the owner exclusive permissions with respect to that data. Sometimes this is referred to as a lock on the data. Typically, ownership means that only the owner can make modifications (write) to the data. It may also mean that only the owner can read the data.

The concept of "ownership" of a given set of data is related to the notion of "locking" data, which is known in the field of databases. Locking data prevents (at least some of) the complications otherwise present when trying to merge changes across replicated nodes, called consistency. The process of trying to merge changes is called conflict resolution. Conflict resolution attempts to ensure that two different changes on the same piece of data are either merged, or reach consistency. If the data isn't merged, the two methods are exclusive access and eventual consistency. Eventual consistency may work when doing many things, but not always. For example, consider a publish/subscribe use case. If two devices connected to the system and write to the same data store, the sequence numbers would 'match' but two messages would be injected with the same number—which is a problem. Considering that such a data store will be constantly updating publishing sequence numbers (clock vectors), speed is important. Hence, even if an eventually consistent solution could be designed, it would likely be too slow for many purposes.

With continued reference to FIG. 1, assume that network enabled device 12334 disconnects from N4 and then, some time later, reconnects to the system. Network enabled device 12334 may have moved such that another node (e.g., node N2) is closest or otherwise positioned to provide the best performance. Or, system load may have changed such that N2 can serve the network enabled device better than N4. Regardless of the reason, if the network enabled device 12334 connects to node N2, its state data needs to be transferred from N4 to N2. To do this, N2 queries the device registry to determine which node currently owns the state data for network enabled device 12334. The device registry replies that N4 is the owner, so node N2 contacts N4 and requests transfer of the ownership of the state data for network enabled device 12334.

Note that if node N4 actually no longer owns the state data for network enabled device 12334 (perhaps because a previous transfer has occurred but is not yet recorded in the device registry), N4 can inform N2 as to whom N4 gave the ownership. N2 can then "chase" the state data by contacting the node designated by N4.

If the end of the "chase" does not prove fruitful, the state can be considered unavailable or lost. In such cases, the process of gaining ownership falls back to the scenario described above, where there was no owner of the state and so the node looking for the state, N4, took ownership of it. In such a case, the state will either need to be rebuilt/recalculated or it will be lost. If the node controller the state and/or the replications were to come back online, that state would need to be invalidated and removed as part of the node's initialization process.

N4 may perform a variety of security checks before allowing the transfer of ownership. For example, if network enabled device 12334 is still connected to N4, that fact indicates that the network enabled device is trying to connect twice (a potential problem, or malfunction somewhere), or that one of the connections may be fraudulent. As another example, the new connection attempt at N4 may be checked to see if it is consistent with prior access patterns/geographies for network enabled device 12334.

If the security checks are passed, then the ownership of the state data is transferred, and N2 replicates it to the followers (shown as N3 and N1 in FIG. 1). Either N4 or N2 (or both) update the device registry with the new home of the state date for network enabled device 12334.

Figure 2:
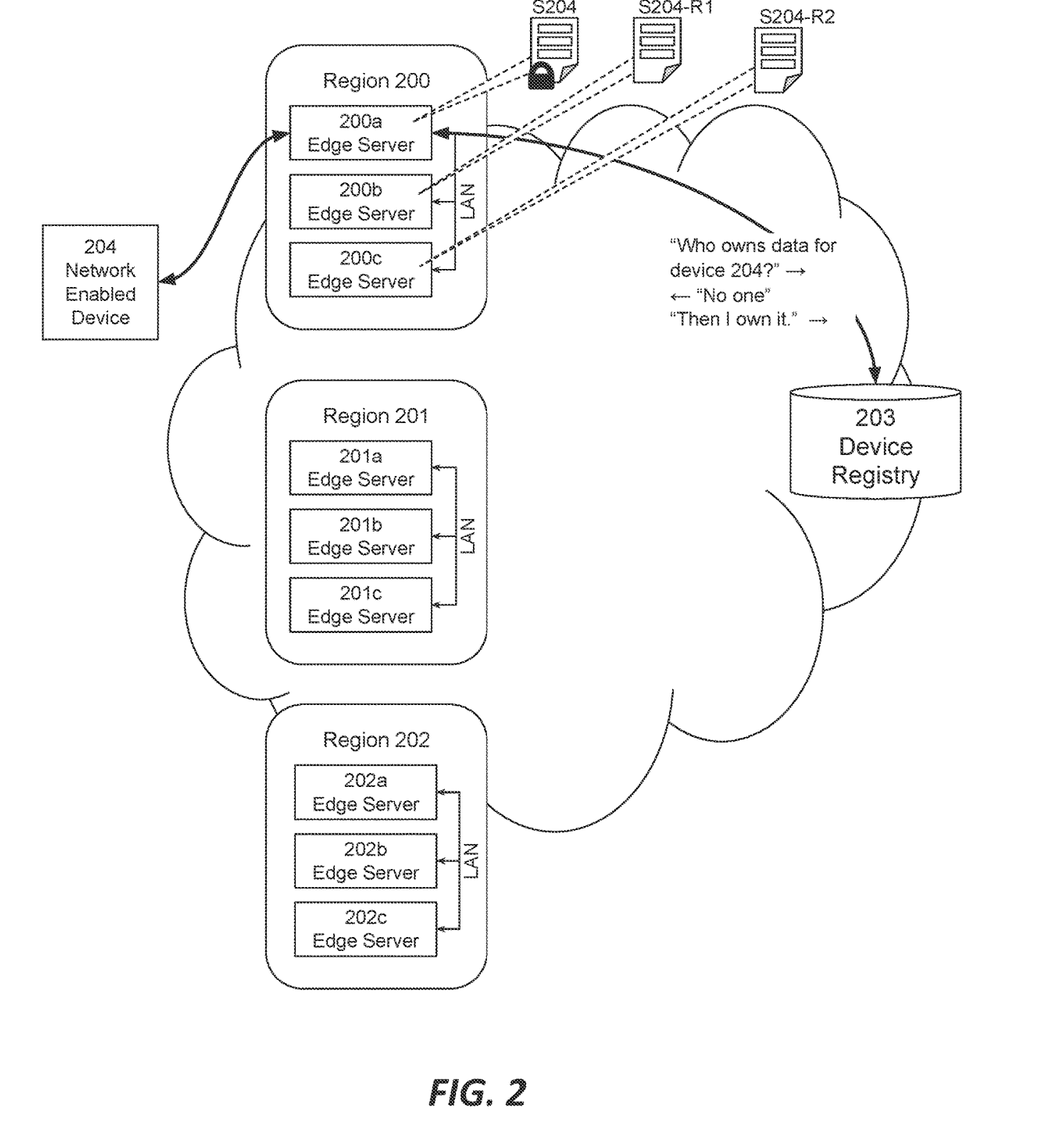
FIG. 2 is a diagram illustrating an embodiment in which the nodes shown in FIG. 1 are edge servers, in accordance with one embodiment of the teachings hereof.

FIG. 2 illustrates another embodiment of the invention. In this embodiment, the nodes are edge servers. Network enabled devices connect to a given edge server to request or otherwise obtain services. The edge servers are grouped into regions (200-202). In each region is a set of co-located edge servers, which are connected to one another via a local network connection (LAN). Regions are essentially the same as data centers, or points of presence (Pops). The system may contain many regions distributed globally around the Internet. The system also includes a device registry 203. Note that while FIG. 2 depicts the device registry 203 as a single, monolithic component, in practice the device registry 203 may be implemented using a replicated or distributed database, pub/sub system, or in any other suitable manner.

The operation of the system shown in FIG. 2 is now described. Assume that network enabled device 204 connects to edge server 200a in region 200. As mentioned earlier, network enabled device 204 may be any kind of device, e.g., a desktop, laptop, smartphone, tablet, home or commercial or industrial appliance, sensor, actuator, or the like. Network enabled device 204 could be a vehicle, equipment, or other object with an embedded network enabled capability. The connection between the network enabled device 204 and edge server 200a can be any kind of network communication channel, but a typical example is a secure TCP/IP connection implementing TLS. For purposes of this document, a set of UDP messages can also be considered a connection (although UDP is sometimes referred to as connectionless in terms of transport layer messaging, that fact is not pertinent here).

Assume that this is the first time that network enabled device 204 has connected to the system of edge servers. Edge server 200a contacts the device registry and finds that there is no owner for data associated with this network enabled device 204. Therefore edge server 200a creates a data structure(s) to hold the state data associated with network enabled 204 and takes ownership of it, informing device registry 203 accordingly. The state data is indicated by S204 and the "ownership" of the state data is indicated by the lock on the state data S204 in FIG. 2. In order to protect a "new" network enabled device from connecting to multiple nodes at the same time, since there is no "lock" or "ownership" yet, various techniques can be used including, locking the registry entry, triggering on conflict resolution during registry consistency, or by having the nodes recheck after consistency has been achieved to check for overlaps.

As the edge server communicates with the network enabled device 204, it stores state data on the server side. Such state data may include data communicated by the network enabled 204 to edge server 200a, data communicated by other edge servers to edge server 200a, and data generated by edge server 200a itself in providing service to the network enabled device 204.

The state data S204 is preferably stored locally in the edge server 200a. In addition, the edge server 200a contacts one or more follower edge servers and the state data is replicated to those edge servers. In FIG. 2 the follower servers are edge server 200b, storing replicate S204-R1 and edge server 200*b*, storing replica S204-R2. Note that the follower edge servers 200*b-c* could be designated in advance, or at the time that the state data S204 is created.

Figure 3:
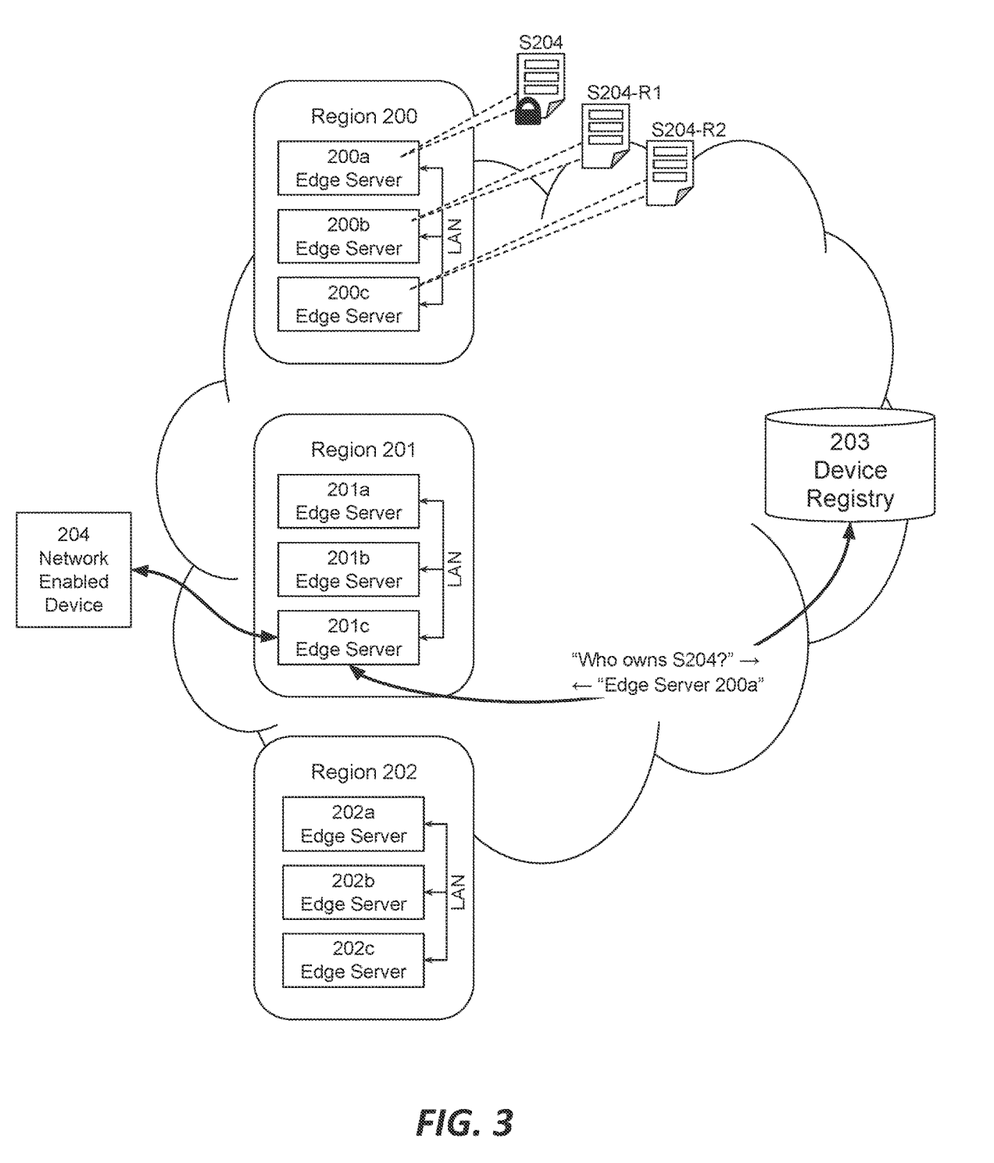
FIG. 3 is a diagram illustrating a query to the device registry in the system shown in FIG. 2, in accordance with one embodiment of the teachings hereof.

FIG. 3 shows a later point in time, when the network enabled device 204 connects to another edge server (here, edge server 201*c* will be used as an example). The particular edge server to which the network enabled device 204 connects may change for a variety of reasons. For example, the network enabled device 204 may disconnect from edge server 200*a*, move to a new location, and then reconnect. As a result the original edge server may no longer be in the best location to optimally serve the network enabled device 204. Or, the network enabled device 204 may be mapped to a new edge server due to system load balancing, or because the original edge server 200*a* experienced a failure.

Regardless of the reason, if the network enabled device 204 is connected to edge server 201*c*, its state data S204 is not present. Hence, edge server 201*c* contacts the device registry 203 to ask who owns the data for network enabled device 204. The device registry replies that edge server 200*a* owns that state data.

Figure 4:
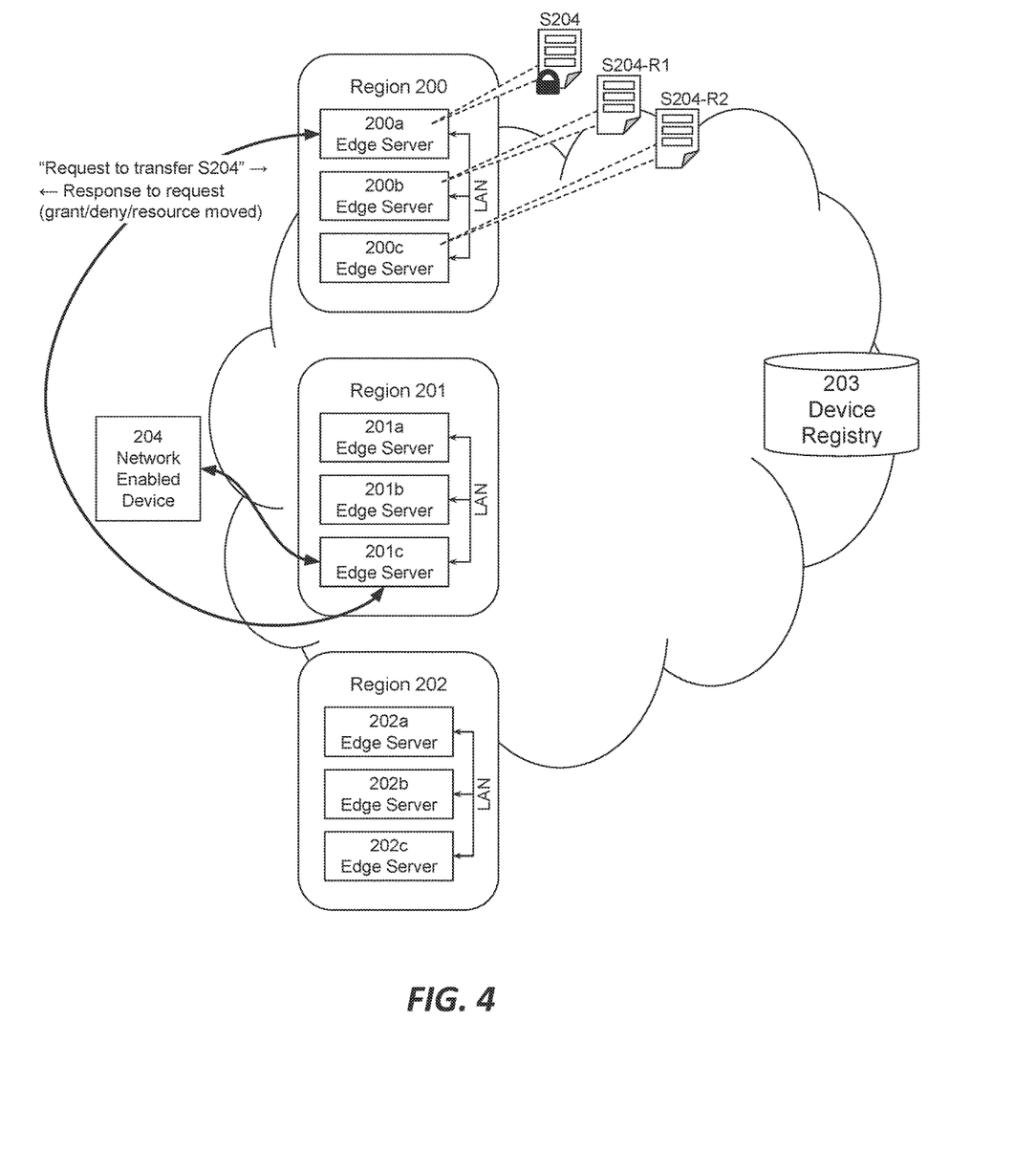
FIG. 4 is a diagram illustrating a process of transferring ownership of state data in the system shown in FIG. 2, in accordance with one embodiment of the teachings hereof.

As shown in FIG. 4, edge server 201*c* contacts edge server 200*a* to request transfer of state data S204 and ownership thereto. Edge server 200*a* must then evaluate the request and decide whether to grant or deny the request. In this process, edge server 200*a* is the "transferor" with respect to ownership of the state data, and edge server 201*c* is the "transferee".

Figure 5:
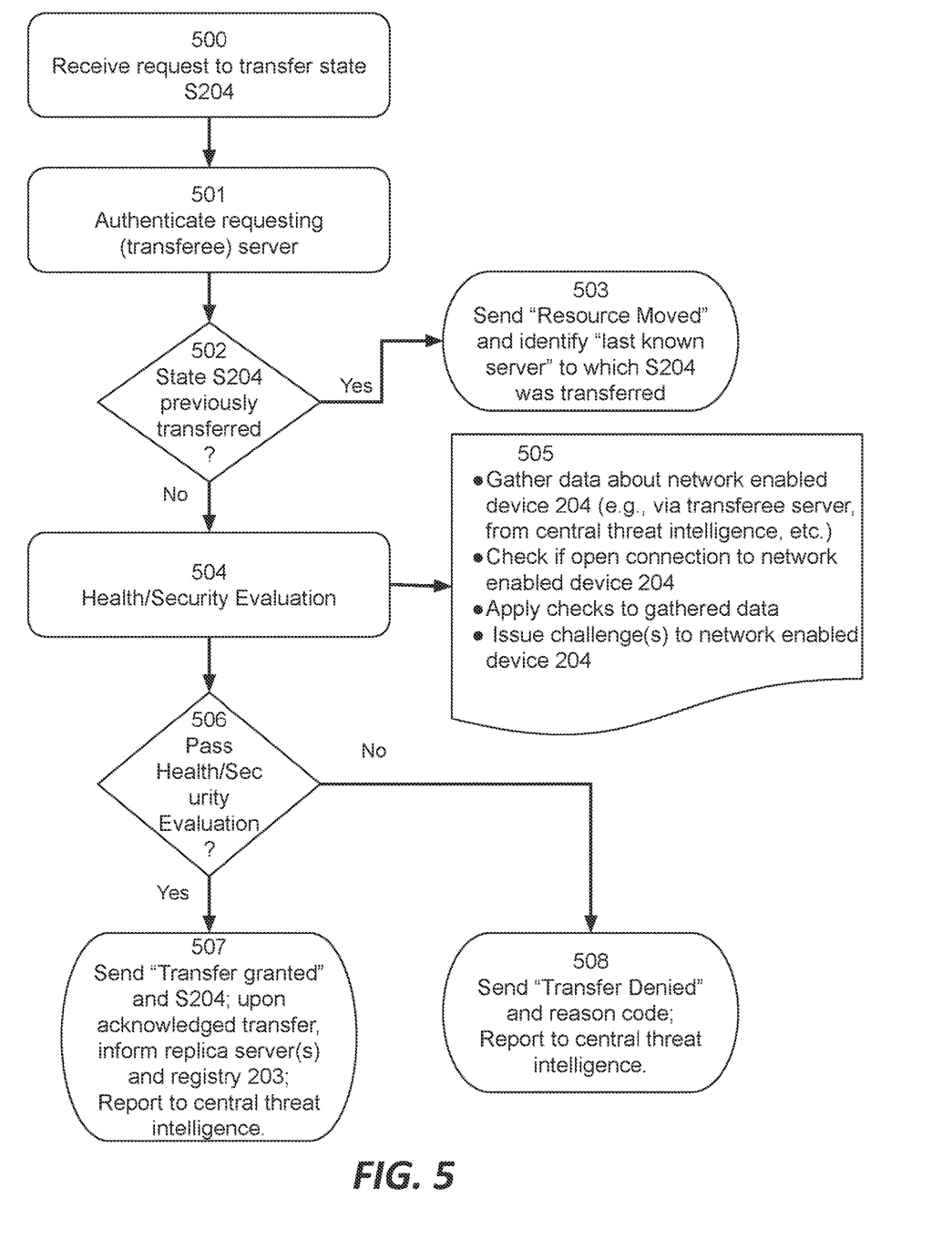
FIG. 5 is a flow diagram illustrating logic executing at the transferor edge server, during the process of ownership transfer within the system shown in FIG. 2, in accordance with one embodiment of the teachings hereof.

FIG. 5 illustrates the decision-making process from the perspective of edge server 200*a* (the "transferor"). FIG. 5 begins with edge server 200*a* receiving the request to transfer state S204 (500). At 501, edge server 200*a* authenticates the transferee edge server 201*c* using any conventional mechanism. At 502, edge server 200*a* checks whether it still owns the requested state S204. If not, at 503 it informs edge server 201*c* and includes the identity of the edge server to which it already transferred the state data. Edge server 201*c* would then chase the state data S204 by contacting the identified server (and repeating the operation if the identified server has also transferred the state data).

If the edge server 200*a* currently owns the state data S204, then the edge server 200*a* initiates a variety of security checks prior to approving transfer (504). Exemplary security checks are illustrated in box 505. The security process will be fully described in more detail in a later section.

If the security checks are passed, then the edge server 200*a* grants the transfer request and sends the state data S204 to the requesting edge server. Once the transfer is acknowledged by edge server 201*c*, then edge server 200*a* can inform the follower edge servers 200*b-c* that they can delete their replicas and it can inform the device registry 204 of the change in ownership.

If the network enabled device 204 fails the security checks, then the edge server 200*a* denies the transfer and, preferably, provides a reason to transferee edge server 201*c*. The failure may be logged for reporting and analysis, and reported to a central threat intelligence subsystem for monitoring and evaluation to improve threat modeling and the accuracy of device reputation scores. (A successful transfer of state data can also be reported to the central threat intelligence to help improve threat modeling and reputation scores.)

Figure 6:
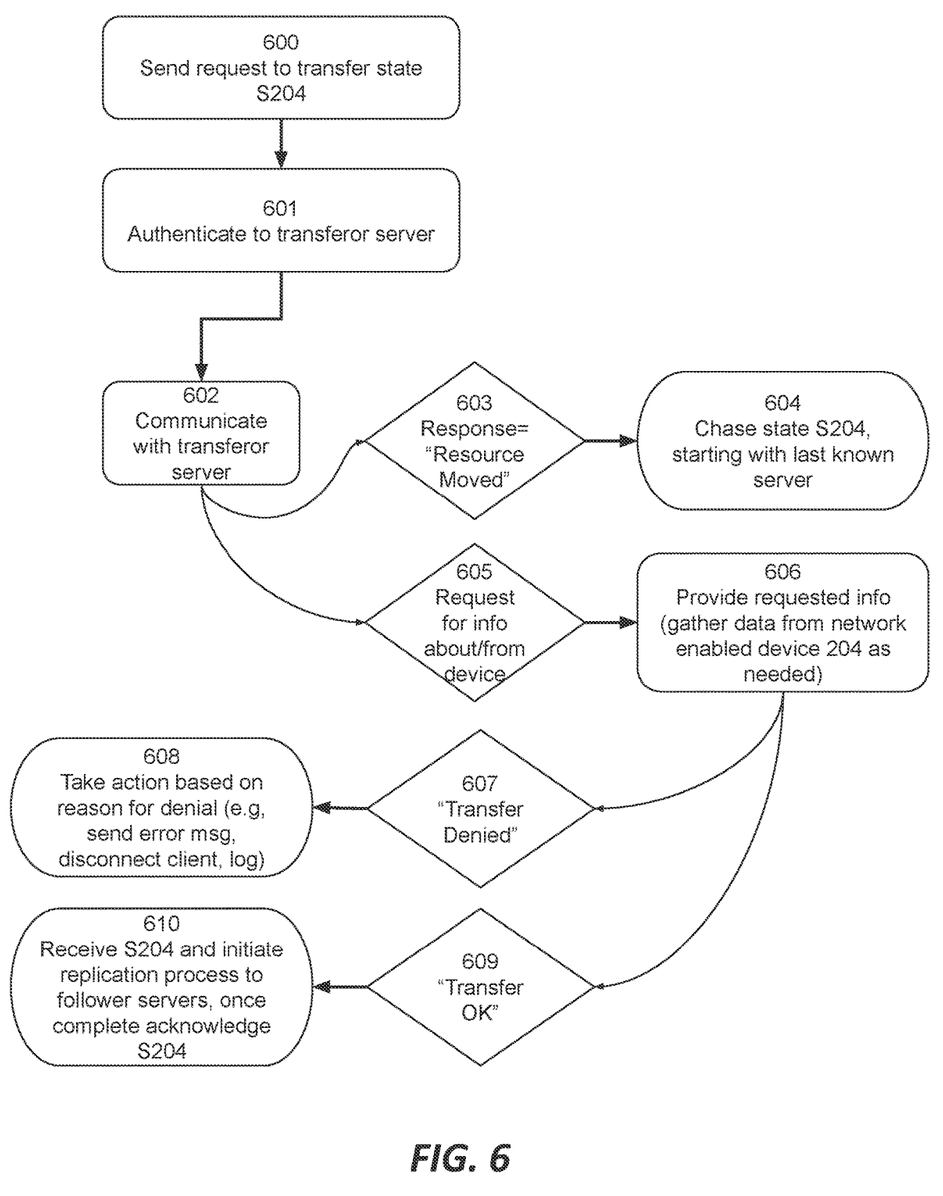
FIG. 6 is a flow diagram illustrating logic executing at the transferee edge server, during the process of ownership transfer within the system shown in FIG. 2, in accordance with one embodiment of the teachings hereof.

FIG. 6 illustrates the process of transferring ownership but from the perspective of the transferee edge server 201*c*. The transferee edge server 201*c* first requests the state transfer from the owner, edge server 200*a* (600). It then authenticates with the transferor edge server 200*a* (this is preferably a two way authentication) (601).

At 602, transferee edge server 201*c* communicates with transferor edge server 200*a*. This communication may proceed in a variety of ways. For example, at 603, if edge server 200*a* responds to the transfer request with a "resource moved" message, then at 604 the edge server 201*c* can end the communication and instead contact the last known server, as mentioned earlier, in effect chasing the state S204.

At 605, if the transferor edge server 200*a* responds to the transfer request with one or more requests for more information about the network enabled device 204, then transferee edge server 201*c* gathers the requested information and relays it (606). Typically, this information gathering is in support of the security evaluation process. Hence, the gathered information might include such things as the network enabled device 204's IP address, TLS characteristics, time at which network enabled device 204 connected, the behavior of the network enabled 204, e.g., what the network enabled 204 requested or sent to edge server 201*c*, and/or any other identifying information or attributes of the network enabled device 204 or the connection. The gathered information may also include the results of tests run by the transferee edge server 201*c*, such as measurements of data rate, traceroutes, and the like, made in relation to the network enabled device 204. To this end, edge server 200*a* might instruct the edge server 201*c* to perform one or more such passive tests. Edge server 200*a* could also instruct the transferee edge server 201*c* to initiate a challenge to the network enabled device 204, e.g., "send me a digest of the last transaction you completed with the system" which can be compared to the records in S204.

Note that, in some embodiments, the transferee edge server 201*c* can process the gathered security information before sending it to the edge server 200*a*. For example, it could calculate a reputation or threat score based on some of the information, and then provide that score (which may reduce the volume of information that needs to be sent to the edge server 200*a*).

At 607, if after the security evaluation, the edge server 200*a* denies the transfer request, then at 608 the transferee edge server 201*c* can take an appropriate action with respect to the network enabled device 204, e.g., drop connection, log incident, send error/refused message to network enabled device 204, and so on The service originally requested by the network enabled device 204 is not actually provided, since the state data S204 is not transferred.

At 609, if after the security evaluation, the transferor edge server 200*a* accepts the transfer request, then it will send the state data S204. The transferee edge server 201*c* receives the state data S204 and initiates the replication process to its associated followers 201*a-b*. Once the process is complete, transferee edge server 201*c* can acknowledge the transfer of ownership, and the transferor and its followers 200*a-c* can delete the state data S204, S204-R1, S204-R2. Either or both of edge servers 200*a*/201*c* can update the device registry 203 about who now owns the state data S204.

Figure 7:
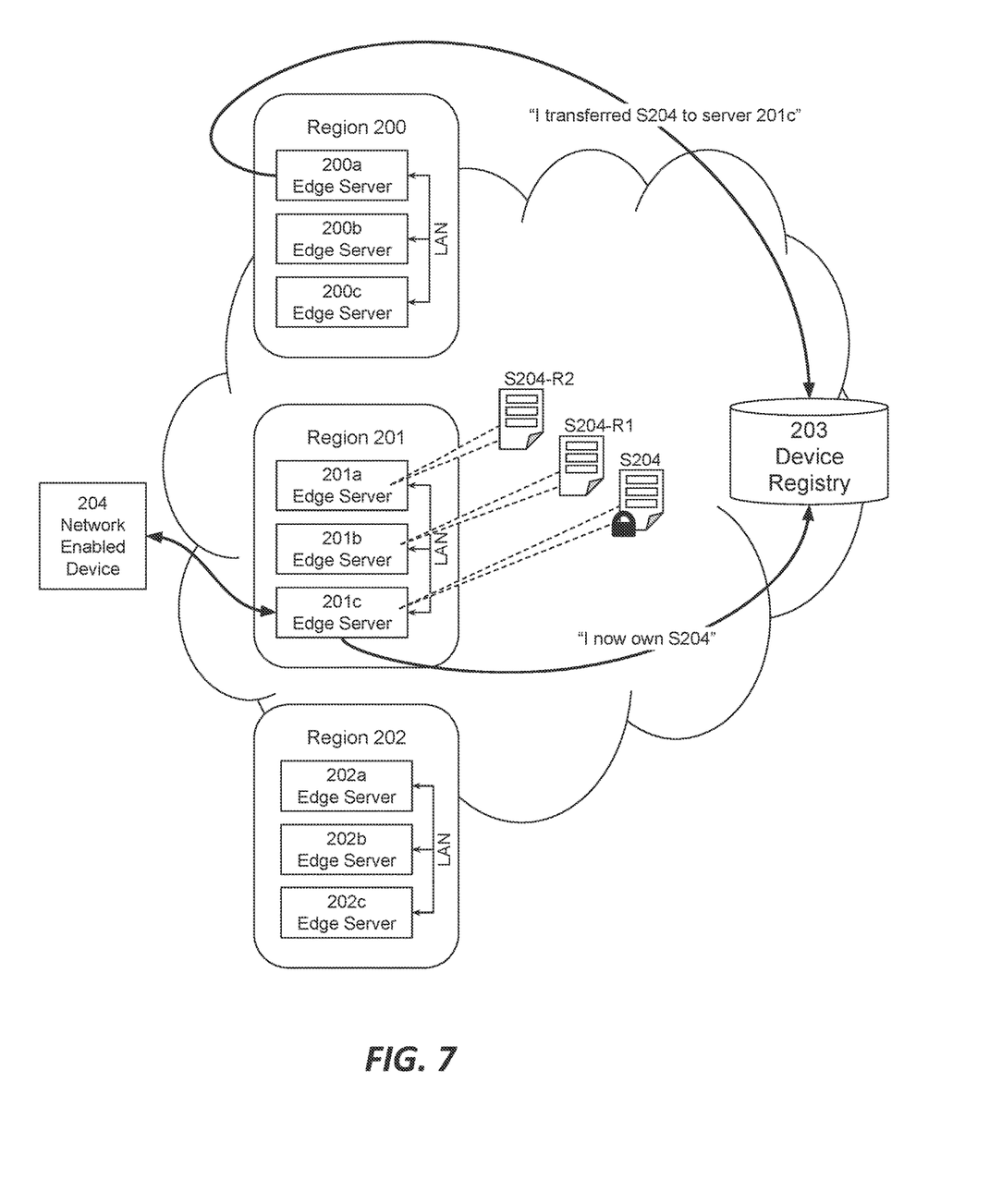
FIG. 7 is a flow diagram illustrating logic the result of the ownership transfer process shown in FIGS. 5-6, in accordance with one embodiment of the teachings hereof; and, FIG. 8 is a block diagram illustrating hardware in a computer system that may be used to implement the teachings hereof.

FIG. 7 shows the final result after a successful transfer of ownership of the state data S204 from edge server 200*a* to edge server 201*c*.

It should be understood that while the foregoing description has largely assumed that the transferor edge server 200*a* directs the security evaluation process, any or all of the process can be driven by the transferee edge server 201*c*.

Health/Security Evaluation (505)

As noted, the process of transferring ownership of a network enabled device's state data provides an opportunity to perform a health/security evaluation. Such an evaluation is unique because (among other things) it can quickly take into account the knowledge available to two different nodes (e.g., edge servers) in the system.

It is important philosophically and for data integrity and security to make sure that a given network enabled device is healthy, authentic and not compromised. A healthy, benign device should connect to one node in the system at a time. Providing such assurances increases confidence in the accuracy of data and in the system overall.

SOME EXAMPLES

If there were thousands, or even just 2, simultaneous connections by what purport to be the same network enabled device, it may be an indication that there is either a configuration error, malfunction in the device or the system, or that the network enabled device's (or end user's) credentials have been compromised, and/or that a DDOS attack is underway. To protect the integrity of the state data, this needs to be blocked. Put another way, if multiple network enabled devices try to get the lock—that is, request ownership of the same state data at the same time—the security evaluation can detect this and block it.

If a particular network enabled device is excessively connecting, and re-connecting, it is a sign of a broken or compromised device. Such a device can no longer be trusted and it can be blocked from connecting. So each connection to a node can be logged and if too many happen at the same time, the device can be blocked.

If a particular network enabled device connects to a node in North America, and then a short time later, it appears to connect to a node in Europe—such infeasible movement is suspicious and one of the two connections may be fraudulent. Generalizing, any suspicious or anomalous pattern of connections could be the basis for blocking.

The following table provides an example set of checks that can be performed during the security evaluation of 505. The table refers to the owning (transferor) node and a node requesting transfer of the data (transferee). If the security checks fail or the conditions are violated, then the transfer may be blocked, the new connection can be dropped by the transferee, and other mitigation actions can be taken.

| Security check/condition | Example of supporting data to gather (as in FIG. 5, step 505) |
|---|---|
| Network enabled devices should not be connected simultaneously to the transferor node and transferee node. Note that this condition may be acceptable in some messaging protocols, provided that the transferor drops the connection prior to transferring the state data and prior to the transferee acknowledging the new connection. As such, the health/security logic in the system can be configured such that, upon transfer request, the transferee node can decide to (i) accept the transfer, and drop the connection to the network enabled device prior to transferring ownership or (ii) reject the transfer, and keep the connection, or (iii) reject the transfer and drop the connection, depending on criteria, such as a rate limiting violation. MQTT protocol, for example, defines "session take over" to mean, a new connection takes precedence over old connections. | Connection status to each node |
| Network enabled device connection rate should not exceed threshold level (configurable). | History of connections with time/dates (could be in state data) |
| Network enabled device should correctly answer challenge based on history of communication with transferor node (eg., last message, secret shared by transferor node) | The transferee node can issue challenges to a network enabled device. |
| Network enabled device should not exhibit infeasible movement given time between connections to transferor and transferee nodes and distance between those nodes | Date/timestamps of connections. Location/geographic coordinates of device (e.g., from GPS or client/node location) Network through which device connects each time IP address at each connect |
| Network enabled device should exhibit consistent characteristics/fingerprint | Query transferee node to obtain TLS fingerprint of device, device posture data. |
| Network enabled device connection patterns should fall within established parameters. | The pattern of connections can be injected into a subsystem using machine learning or the like to determine a "normal" connection pattern and then track connections, through the associated state data, to determine if a new connection is anomalous - the connection could be flagged or blocked for further analysis. |

Importantly, a health/security violation can lead not only to the system blocking or reporting the connection, but also to marking the network enabled device as a "bad" device. As was mentioned at the outset, if the device registry has a device marked as a "bad" device, it can inform a node that is inquiring about ownership to drop the connection right away.

Node Authentication

The process of transferring ownership of state data is not only an opportunity for the system nodes to authenticate the network enabled device, but also an opportunity for that device to authenticate the node to which it is connecting. For example, the network enabled device can ask the transferee node about previous transactions or a secret shared with the transferor node. The network enabled device can authenticate the transferee node by seeing if it correctly responds to a challenge requesting this information, which the transferee node can obtain from the transferor node. Of course, such information could be available to all nodes from a central origin or repository. But the node to node transfer process enables this type of authentication to occur more quickly and does not require backhauling all such data to a central location.

Alternative Implementation with Each Network Enabled Device Having its Own Partition In the implementation described above, the system provided a distributed database such that each node (e.g., edge server) has its own partition, replicated to one or more associated follower nodes. In an alternate implementation, each network enabled device has its own partition. When a network enabled device connects to a given node, a leader election process (e.g., using Paxos, Raft, or the like) is executed in the system. The leader election process elects that node as the leader for that device's partition (with one or more follower nodes just as before). Note that if the node did not win the leader election (e.g., because another node was already connected), then it could disconnect. In this way, a node becomes the leader of the partition for the network enabled device. Finally, the system can be configured to give the leader the ownership of the data in the partition (in other words, the lock already described previously). Any or all aspects of the health and security evaluation described above can be performed in conjunction with the leader election process so as to block the transfer of leadership if there is a health and/or security problem.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessor s to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a common off the shelf hardware such as Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
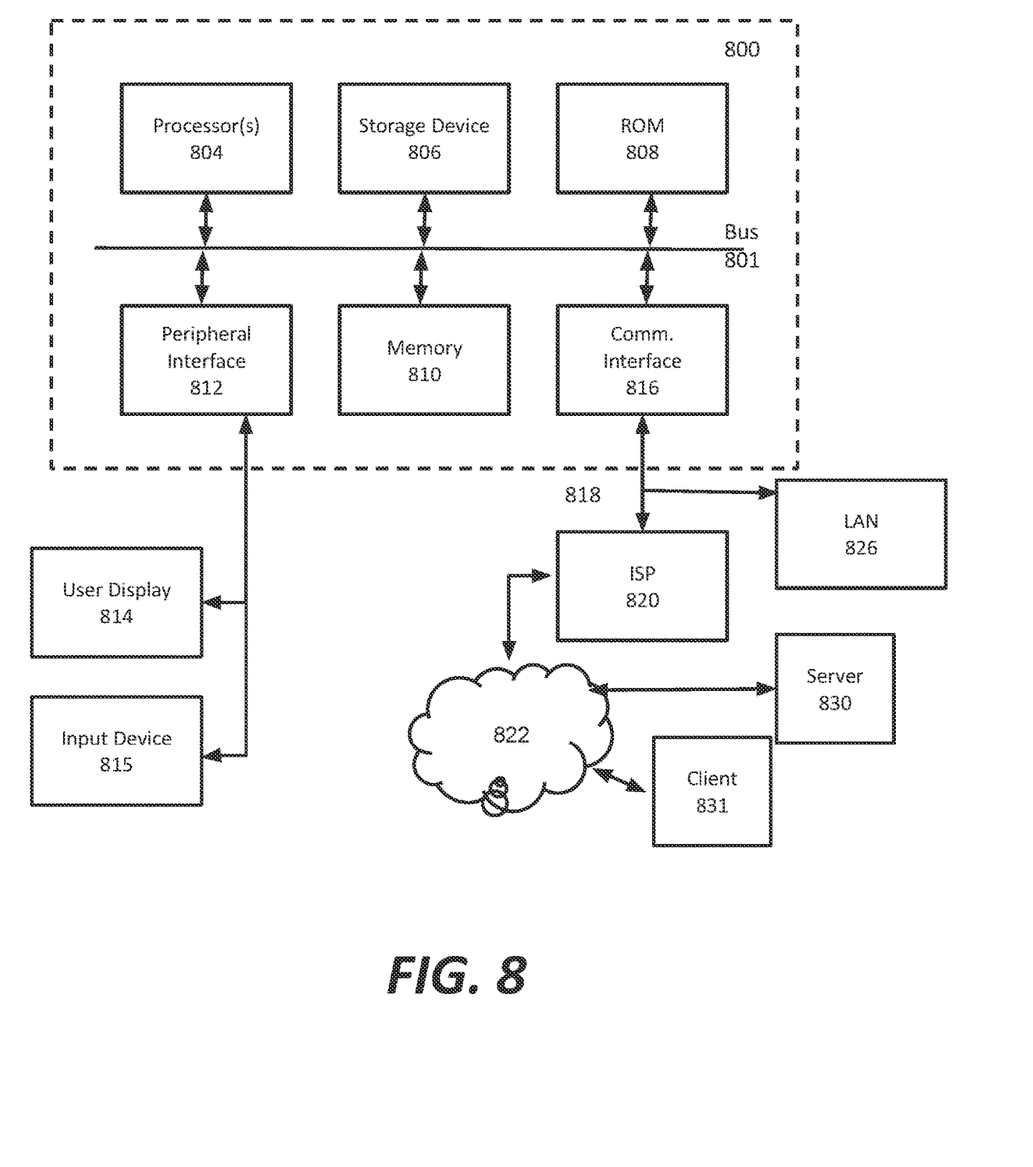

FIG. 8 is a block diagram that illustrates hardware in a computer system 800 upon which such software may run in order to implement embodiments of the invention. The computer system 800 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 800 includes a microprocessor 804 coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. A non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

A peripheral interface 812 may be provided to communicatively couple computer system 800 to a user display 814 that displays the output of software executing on the computer system, and an input device 815 (e.g., a keyboard, mouse, trackpad, touchscreen) that communicates user input and instructions to the computer system 800. However, in many embodiments, a computer system 800 may not have a user interface beyond a network port, e.g., in the case of a server in a rack. The peripheral interface 812 may include interface circuitry, control and/or level-shifting logic for local buses such as RS-485, Universal Serial Bus (USB), IEEE 1394, or other communication links.

Computer system 800 is coupled to a communication interface 816 that provides a link (e.g., at a physical layer, data link layer) between the system bus 801 and an external communication link. The communication interface 816 provides a network link 818. The communication interface 816 may represent an Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 818 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of storing data associated with a network enabled device that connects to one or more nodes in a distributed computing system, the method comprising:
   establishing a first connection between a network enabled device and a first node in a distributed computing system;
   as a result of the first node providing a service to the network enabled device, storing a set of data associated with the network enabled device in the distributed computing system;
   giving the first node ownership of the set of data, where ownership comprises:
      restricting a permission on the set of data such that the first node in the distributed computing system is permitted to modify the set of data and other nodes in the distributed computing system are excluded from modifying the set of data;
   in response to a second connection from the network enabled device at a second node in the distributed computing system, requesting the first node to transfer ownership of the set of data to the second node;
   upon the first node transferring ownership of the set of data to the second node, the first node storing a record of said transfer including an identifier of the second node; and,
   in response to a third connection from the network enabled device at a third node in the distributed computing system, the third node attempting to locate the owner of the set of data by asking the second node to whom the second node transferred ownership, and the second node responding based on the record of said transfer.

2. The method of claim 1, wherein the first node has a partition of a distributed database in the distributed computing system, and the first node stores the set of data in that partition.

3. The method of claim 1, further comprising: providing a device registry for any of the first, second and third nodes to query so as to locate which node has ownership of the set of data associated with the network enabled device.

4. The method of claim 1, wherein the first and second nodes comprise first and second edge servers, respectively.

5. The method of claim 1, further comprising: the first node generating the set of data as a result of the first node providing the service to the network enabled device.

6. The method of claim 1, further comprising performing a security evaluation prior to transferring the ownership of the set of data from the first node to the second node.

7. The method of claim 6, wherein the security evaluation comprises:
   a feasibility check of distance moved given time between first and second connections and distance between first and second nodes.

8. The method of claim 6, wherein the security evaluation comprises:
   a check for a consistent device fingerprint across first and second connections.

9. The method of claim 6, wherein the security evaluation comprises:
   a challenge to the network enabled device requiring proof of knowledge of communication with the first node from the first connection, other than authentication information.

10. A distributed computing system having a plurality of nodes and providing a data store for network enabled devices connecting to the distributed computing system, the system comprising:
    a plurality of nodes having circuitry forming a plurality of processors and memory holding instructions for execution on the plurality of processors to:
       establish a first connection between a network enabled device and a first node in a distributed computing system;
       as a result of the first node providing a service to the network enabled device, store a set of data associated with the network enabled device in the distributed computing system;
       giving the first node ownership of the set of data, where ownership comprises:
          restricting a permission on the set of data such that the first node in the distributed computing system is permitted to modify the set of data and other nodes in the distributed computing system are excluded from modifying the set of data;
       in response to a second connection from the network enabled device at a second node in the distributed computing system, request the first node to transfer ownership of the set of data to the second node;
    upon the first node transferring ownership of the set of data to the second node, the first node storing a record of said transfer including an identifier of the second node; and,
    in response to a third connection from the network enabled device at a third node in the distributed computing system, the third node attempting to locate the owner of the set of data by asking the second node to whom the second node transferred ownership, and the second node responding based on the record of said transfer.

11. The system of claim 10, wherein storing the set of data comprises storing the set of data in a database partition at the first node.

12. The system of claim 10, where the plurality of nodes have circuitry forming a plurality of processors and memory holding instructions for execution on the plurality of processors to: upon a determination to grant the transfer of ownership to the second node, move the set of data from the first node to the second node.

13. The system of claim 10, further comprising performing a security evaluation prior to transferring the ownership of the set of data from the first node to the second node.

14. The system of claim 13, wherein the security evaluation comprises:
    a feasibility check of distance moved given time between first and second connections and distance between first and second nodes.

15. The system of claim 13, wherein the security evaluation comprises:
    a check for a consistent device fingerprint across first and second connections.

16. The system of claim 13, wherein the security evaluation comprises:
    a challenge to the network enabled device requiring proof of knowledge of communication with the first node from the first connection, other than authentication information.

17. A non-transitory computer readable medium holding computer program instructions for execution on one or more hardware processors, the computer program instructions including instructions to:

establish a first connection between a network enabled device and a first node in a distributed computing system;

as a result of the first node providing a service to the network enabled device, store a set of data associated with the network enabled device in the distributed computing system;

give the first node ownership of the set of data, where ownership comprises:
  restricting a permission on the set of data such that the first node in the distributed computing system is permitted to modify the set of data and other nodes in the distributed computing system are excluded from modifying the set of data;

in response to a second connection from the network enabled device at a second node in the distributed computing system, request the first node to transfer ownership of the set of data to the second node;

upon the first node transferring ownership of the set of data to the second node, the first node storing a record of said transfer including an identifier of the second node; and, in response to a third connection from the network enabled device at a third node in the distributed computing system, the third node attempting to locate the owner of the set of data by asking the second node to whom the second node transferred ownership, and the second node responding based on the record of said transfer.

* * * * *